No. 11,761. Reissued July 25, 1899.
J. KILBURN.
BEARING FOR SPINDLES.
(Application filed Feb. 1, 1899.)
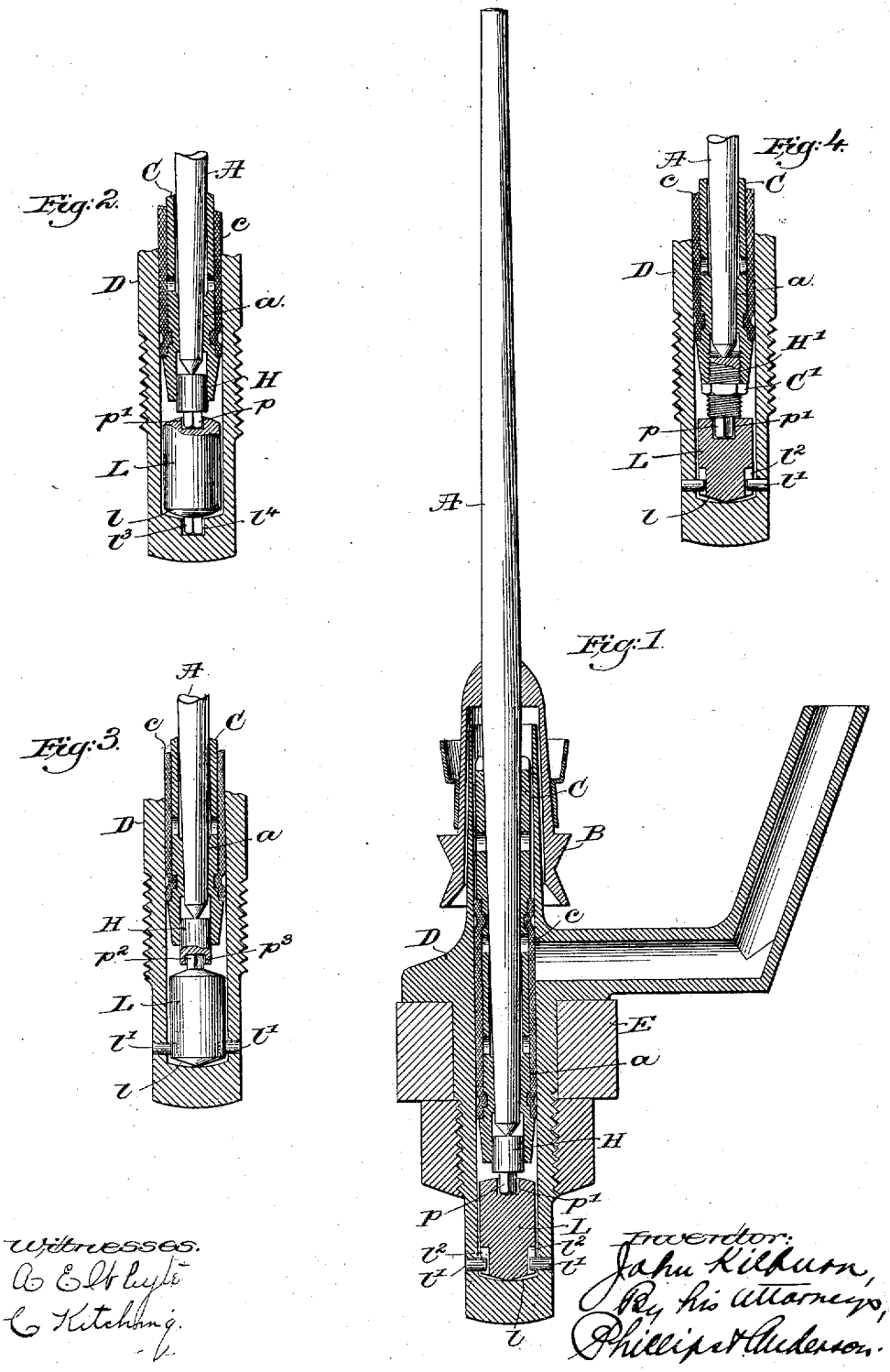
Witnesses.
A. E. Hyde
C. Kitching.
Inventor:
John Kilburn,
By his Attorneys,
Phillips & Anderson.
THE NORRIS PETERS CO., PHOTO-LITHO., WASHINGTON, D. C.

UNITED STATES PATENT OFFICE.

JOHN KILBURN, OF BELMONT, MASSACHUSETTS.

BEARING FOR SPINDLES.

SPECIFICATION forming part of Reissued Letters Patent No. 11,761, dated July 25, 1899.

Original No. 590,314, dated September 21, 1897. Application for reissue filed February 1, 1899. Serial No. 704,206.

*To all whom it may concern:*

Be it known that I, JOHN KILBURN, a citizen of the United States, residing at Belmont, in the county of Middlesex and State of Massachusetts, have invented certain new and useful Improvements in Bearings for Spindles; and I do hereby declare the following to be a full, clear, and exact description of the invention, such as will enable others skilled in the art to which it appertains to make and use the same.

As spindles of the "self-centering" or "top" type are commonly mounted it is of the greatest importance that the bolster or tubular support within which the spindle rotates should be freely movable to allow the spindle to find its true center of rotation under an unbalanced load and that the bolster should at the same time be restrained from rotation with the spindle.

Various devices have heretofore been proposed to secure the results above suggested; but such devices, in so far as I am informed of the art, have been found to be objectionable in that they impede the operation of the spindle or are too sensitive and liable to get out of repair; and the principal object of the present invention is to provide a simple and durable device to be substituted therefor.

Another object of the present invention is to provide an improved means for adjusting the step or bearing-point of the bottom of the spindle to raise the spindle in the bolster to prevent the pintle of the spindle, which commonly tapers toward its lower end, from binding upon the walls of the bolster as the lower end of the spindle wears off or into the step.

To the above ends the present invention consists of the devices and combinations of devices hereinafter more particularly set forth in this specification and pointed out in the claims.

The present invention is illustrated in the accompanying drawings, in which—

Figure 1 is a vertical section through a spindle-support embodying the same, showing the spindle in elevation. Fig. 2 is a vertical section through the lower portion of the bolster-case, parts appearing in elevation, showing a modified form of the present invention. Figs. 3 and 4 are similar views illustrating other modifications.

In the drawings, A represents the spindle, having the usual tapered pintle *a*, B its whirl, C the bolster, conveniently surrounded by the usual wicking or other elastic packing *c*, D the bolster-case, and E the spindle-rail, all of which parts, except as hereinafter specified, may be and conveniently are of any usual or convenient construction and in themselves form no essential feature of the present invention.

H represents the rest or bearing for the lower end of the spindle, commonly termed the "step."

I have shown in the drawings two forms of connections for the step and bolster, in one of which the step H is inserted with a tight driving fit in the bottom of the bolster C, (see Figs. 1, 2, and 3,) an arrangement to be hereinafter referred to, and in the other the step H′ is threaded and screwed into threaded bearings in the bottom of bolster C, a check-nut C′ being provided to lock the step H in the required position.

In accordance with the present invention the step H is supported on a pintle L, which rests upon a suitable support and is free to tip laterally in all directions.

As shown in the drawings, the pintle L is circular in section and slightly less in diameter than the bore of the bolster-case D, so that its lateral movement is limited by contact therewith; but I desire to say that while I prefer to make the pintle L of substantially the form shown, on account of the strength and simplicity of the arrangement, I do not wish to limit my invention thereto, as the pintle L may be varied in form and relative size and other means provided to limit its lateral movement without any departure from the present invention.

The pintle L rests upon a suitable support, preferably the base of the bolster-case D, and the base *l* of said pintle L is shaped to allow the pintle to tip freely, as hereinbefore stated, the base *l*, as shown in the drawings, being conical in shape.

The step H (or H′) is loosely connected wtih the pintle L either by a tongue *p*, projected therefrom and engaging a recess *p′* upon the pintle L, (see Figs. 1, 2, and 4,) or by a reverse arrangement, in which the tongue $p^2$ is formed upon the pintle L and the recess $p^3$ in the step H, (see Fig. 3,) or by other suitable means which will not interfere with the free lateral movement of the pintle.

To restrain the bolster C from rotation, I prefer to restrain the pintle L by its connection with the bolster-case and the bolster C by its connection with the pintle L.

I have shown in the drawings two methods of restraining the pintle L from rotation, one by means of the pins $l'$, driven through the walls of the bolster-case D (see Figs. 1, 3, and 4) and engaging vertical slots $l^2$ in the pintle L, and the other by means of the polygonal tongue $l^3$, projected from the pintle L and engaging a correspondingly-shaped recess $l^4$ in the base of the bolster-case D. It is evident, however, that other methods of restraining the pintle L may be used without any departure from the essential features of the present invention.

To restrain the bolster C from rotation with reference to the pintle, the tongue $p$ (or $p^2$) and the recess $p'$ (or $p^3$) are formed of a similar shape in section, the recess $p'$ (or $p^3$) being slightly larger in section, so that the tongue $p$ (or $p^2$) by its engagement therewith restrains the step H, and hence the bolster $c$, from rotation without interfering with the free lateral movement of the pintle L or bolster C.

It will be noted that in the form of my invention shown in Figs. 1, 2, and 3 of the drawings, in which the driving-step H is supported upon the pintle L, the pintle L forms a firm support for the step H, capable of withstanding the shock of a blow on the bolster sufficient to drive the step into the bolster, so that the step H can be adjusted within the bolster C without removing the bolster from the case, a feature which I deem of great importance as greatly facilitating the adjustment of the bolster and step to secure the proper position of the spindle in the bolster.

Having thus described my invention and its mode of operation, I claim as novel and desire to secure by Letters Patent of the United States—

1. In a spindle-support the combination with a bolster, of a step held by a driving fit within the bolster, and a loosely-held pintle supporting the step, substantially as described.

2. In a spindle-support the combination with a bolster, of a step movable along the bolster, a loosely-held pintle supporting the step free to tip laterally in all directions, and a loose connection between the step and pintle, substantially as described.

3. In a spindle-support the combination with a spindle having a tapered pintle and a bolster having a tapered bearing, of a step held by a driving fit within the bolster, and a support for the step within the bolster-case, formed and arranged to support the step while the bolster is driven onto the same, substantially as described.

4. In a spindle-support the combination with the bolster-case and bolster, of a step carried by the bolster, a loosely-held pintle free to tip laterally in all directions supporting the step, connections between the pintle and bolster-case and the pintle and step whereby the bolster is restrained from rotation, substantially as described.

5. In a spindle-support, the combination with the bolster of a loosely-held pintle supporting the same and free to tip laterally in all directions, and means for restraining the pintle from rotation substantially as described.

6. In a spindle-support, the combination with the bolster-case and the bolster, of a loosely-held pintle supporting the bolster and free to tip laterally in all directions, said pintle being provided with a body portion fitted loosely to the bore of the bolster-case and arranged to limit the lateral movement of the pintle by contact with the bolster-case, substantially as described.

7. In a spindle-support, the combination with the bolster and a step movable along the bolster, of a pintle free to tip laterally in all directions supporting the step, and a coöperating tongue and recess upon the step and pintle, whereby the step is held in position upon the pintle without interfering with the lateral movement of the pintle, substantially as described.

8. In a spindle-support the combination with the bolster-case and bolster, of a step, a pintle supporting the step, engaging polygonal tongues and recesses upon the step, pintle and bolster-case, substantially as described.

9. In a spindle-support, the combination with a bolster, of a step within the bolster movable longitudinally along the bolster, and a pintle free to tip in all directions supporting the step, substantially as described.

10. In a spindle-support, the combination with a bolster, of a step movable longitudinally within the bolster, and a pintle supporting the step and restraining it from rotation, substantially as described.

11. In a spindle-support, the combination with a bolster having a step fitted within the same, of a loosely-held pintle supporting the step, and free to tip laterally in all directions, substantially as described.

In testimony whereof I affix my signature in presence of two witnesses.

JOHN KILBURN.

Witnesses:
A. E. WHYTE,
T. HART ANDERSON.